(12) United States Patent  (10) Patent No.: US 8,939,447 B2
Remijnse et al.  (45) Date of Patent: Jan. 27, 2015

(54) ITEM COLLATING SYSTEM AND METHOD

(71) Applicant: Neopost Technologies, Bagneux (FR)

(72) Inventors: Jan Jacobus Peter Remijnse, Meppel (NL); Sjoerd Van Netten, Drachten (NL); Thomas Rudolphi, Oosthem (NL)

(73) Assignee: Neopost Technologies, Bagneux (FR)

( * ) Notice: Subject to any disclaimer, the term of this patent is extended or adjusted under 35 U.S.C. 154(b) by 0 days.

(21) Appl. No.: 13/755,787

(22) Filed: Jan. 31, 2013

(65) Prior Publication Data
US 2013/0192953 A1 Aug. 1, 2013

(30) Foreign Application Priority Data

Jan. 31, 2012 (EP) .................................... 12153389

(51) Int. Cl.
B65H 43/04 (2006.01)
B65G 43/08 (2006.01)
B65H 29/04 (2006.01)
B65H 29/68 (2006.01)

(52) U.S. Cl.
CPC .............. B65G 43/08 (2013.01); B65H 29/041 (2013.01); B65H 29/68 (2013.01); B65H 2301/44712 (2013.01); B65H 2301/4474 (2013.01); B65H 2404/2311 (2013.01); B65H 2511/11 (2013.01); B65H 2511/12 (2013.01); B65H 2511/13 (2013.01); B65H 2511/20 (2013.01); B65H 2511/51 (2013.01); B65H 2513/10 (2013.01); B65H 2513/20 (2013.01); B65H 2515/10 (2013.01); B65H 2557/242 (2013.01); B65H 2701/1916 (2013.01)
USPC .......................................... 271/199; 271/204

(58) Field of Classification Search
USPC ....................... 271/199, 202–204, 82, 85, 270
See application file for complete search history.

(56) References Cited

U.S. PATENT DOCUMENTS

| 3,861,672 | A | * | 1/1975 | Norton ........................... 271/203 |
| 4,678,172 | A | | 7/1987 | Faltin |
| 5,556,086 | A | | 9/1996 | Munneke et al. |
| 8,025,288 | B2 | * | 9/2011 | Shoji et al. ..................... 271/242 |
| 2005/0067761 | A1 | | 3/2005 | Schafer et al. |
| 2009/0250862 | A1 | | 10/2009 | Oosterhoff et al. |
| 2010/0164162 | A1 | | 7/2010 | Obuchi |
| 2010/0270125 | A1 | | 10/2010 | Bijl |

FOREIGN PATENT DOCUMENTS

| DE | 42 35 961 A1 | 4/1994 |
| DE | 19539598 A1 | 4/1997 |
| DE | 10-2004-030277 A1 | 2/2005 |
| DE | 10-2007-028132 A1 | 12/2008 |
| GB | 2156786 A | 10/1985 |
| WO | 2010/026647 A1 | 3/2010 |

* cited by examiner

Primary Examiner — Michael McCullough
(74) Attorney, Agent, or Firm — Sughrue Mion, PLLC

(57) ABSTRACT

A postal item collating system is disclosed. The system includes a postal item feeding path (3), a plurality of grippers (8) receptive of a postal item (2) from the feeding path (3), and a drive (11) for driving the plurality of grippers (8) along a circulation path (10). A collector (12) is disposed downstream from the postal item feeding path (3) and removes a received postal item (2) from a gripper (8) as it proceeds past the stationary collector (12). A controller (21) in signal communication with the drive (11) is responsive to a property signal (31, 34) based upon a property of the received postal item (2) to adjust a velocity of the string of grippers (8).

18 Claims, 5 Drawing Sheets

![US 8,939,447 B2]

ITEM COLLATING SYSTEM AND METHOD

BACKGROUND OF THE INVENTION

The present disclosure relates generally to item handling, and particularly to collating devices.

Collating devices are used to collate flat items such as sheets, cards or envelopes, for instance to be further processed, for example to be folded and inserted into an envelope. Successful processing may require the items to be collected in a fashion having accurately controlled alignment of the items relative to one another and/or relative to a desired reference alignment.

In order to be able to collate and align items of different lengths, collating devices have employed various design features. U.S. Pat. No. 5,556,086 discloses a collating system using endless belts. A disadvantage of such system is the dependency of the collating result on the surface friction coefficients of the postal items (mutually and in interaction with the transporting means and stationary surfaces).

This disadvantage can be avoided using a system that is gripping each item during collation, as described in US patent application 2009/0250862A1 and US patent application 2010/0270125A1. The grippers are arranged for motion along a circulation path to carry items from an input area to a collection station. Such a collating system enables a relatively simple, compact and low cost solution for aligned collation of postal items of different sizes. However, while keeping the collating system relatively simple, transport velocity of the grippers along the circulation path (and thus processing throughput of the device) is limited because the items would be damaged or misaligned if the velocity at which the items are transferred to said collection station is too high.

Paper conveying machines are further known from DE 42 35 961 A1 and WO 2010/026647 A1.

US patent application US 2010/164162 A1 teaches to manually input a sheet size to be treated by an image forming apparatus in order to adjust a velocity of a discharge portion, comprising a belt with two grippers and discharge rollers. Further, a sensor detects the front end of a paper sheet being fed to a stacker, and based on the known length of the paper, the timing to change the velocity is determined.

In U.S. Pat. No. 4,678,172, a transport system for printed products is disclosed, wherein the speed can be varied in response to e.g. the press speed. The position of the printed products is detected by detection means for adjustment of speed for the conveyor belt.

BRIEF DESCRIPTION OF THE INVENTION

It is an object of the invention to provide a collating system that is a relatively simple, compact and low cost solution yet allows an increased throughput of items that are collated, without entailing an accordingly increased risk of causing damage to the items or misalignment of the collated items.

To achieve this object, the invention provides a postal item collating system according to claim 1.

Another embodiment of the disclosure includes a method of collating postal items according to claim 9.

Particular embodiments of the invention are set forth in the dependent claims.

These and other advantages and features will be more readily understood from the following detailed description of preferred embodiments of the invention that is provided in connection with the accompanying drawings.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the disclosed invention provides a collating device in which the speed of an item is controlled based upon one or more item properties to enhance processing speed and item alignment while reducing the risk of damage to the items. In an example embodiment, a sensor measures a thickness of the item and a controller controls the speed of a belt carrying the item to reduce the chance of misalignment and/or damage of the item. In the present description, it is assumed the controlling the velocity involves adjusting the velocity from a current velocity or from standstill. However, in some cases it may be that the current velocity is suitable for handling the received postal item, so controlling involves no change from the current velocity.

Figure 1:
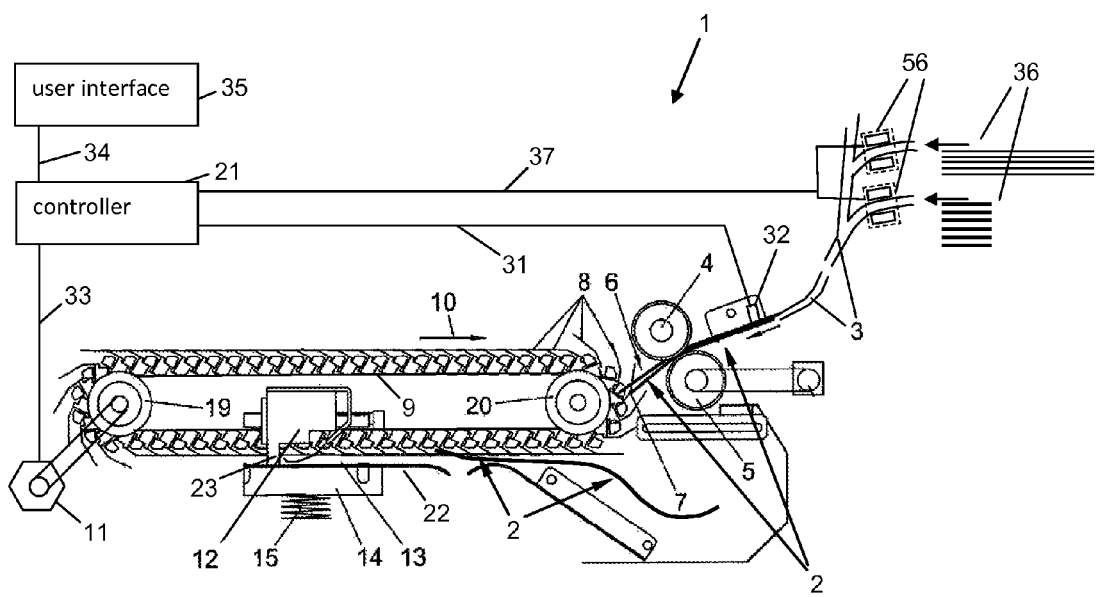
FIG. 1 depicts a schematic drawing of an apparatus for gathering items in accordance with an embodiment of the disclosure.

FIG. 1 depicts an example of an apparatus for gathering items (also herein referred to as a "collating system") according to the invention. In the example as shown, the apparatus 1 is in an operating condition in which an item 2 is transported along a feeding path 3, (also referred to herein as a "feed"). An item 2 is an example of a received postal item. As used herein, the term "postal item" shall refer to any item of any appropriate material that may be processed and gathered together via apparatus 1 and subsequently submitted to a postal service for delivery. The postal item 2 may be collected, folded, and inserted into an envelope, for example. Postal items 2 may include, without limitation, for example sheets of paper or plastic, post cards, booklets, (return) envelopes, advertisements, credit cards (optionally on a carrier), and computer media.

A nip between a set of feeding rollers 4, 5 constitutes a downstream end 6 of the feeding path 3. The apparatus comprises at least one gripper 8. Preferably, the apparatus comprises a plurality of grippers, which forms a string of grippers. The feeding rollers 4, 5 can be driven to feed a leading edge 7 of the postal item 2 towards one of said string of grippers 8 mounted on a carrier 9, carrying the grippers 8 (for drawing clarity, only some of the grippers 8 are designated by reference numerals). In the example shown in FIG. 1, the carrier 9 is a belt 9 and the plurality of grippers 8 are mounted to the belt 9 and are disposed to overlap one another, thereby increasing a postal item 2 handling capability of the apparatus 1. Such a construction, where grippers 8 are overlapping, increases the ability to handle a relatively high number of items 2 that can be carried simultaneously in a compact collating system, and to enable the gripping of items 2 that are fed from the feeding path 3 in an overlapping manner. Moreover, it can also offer the beneficial ability to receive items 2 from a feeding path 3 without requiring precise timing of the feeding of the items 2 with respect to the movement or position of the grippers 8. Instead of being mounted to a carrier, the grippers may also be coupled directly to each other as is for instance disclosed in US patent application 2010/0270125.

Movement of the belt 9, causes the string of grippers 8 to be circulated along a circulation path 10. Movement of the belt 9 and grippers 8 along the circulation path can be driven by a drive motor 11 (also referred to herein as a "drive") in operative communication with at least one end roller 19, 20. A controller 21 has an output in signal communication with the drive 11 via a control signal line 33 and provides adjustment of the transport speed of the belt 9 (and thus the grippers 8 and any paper items 2 carried therein). This may be done for example by adjustment of the motor speed or by adapting a transmission between the motor and said end roller 19, 20. A collector 12 is arranged downstream in a circulation sense from the downstream end of the feed 3, as part of a delivery section 22 of the circulation path 10. The collector 12 has a stopper 23 for collecting and removing postal items 2 from the grippers 8 as they proceed past the collector 12 and the postal items 2 abut against the stopper 23.

As shown in the present example, grippers 8 are responsive to geometry of the circulation path 10 to move apart, or open a jaw formed by two connected grippers 8 as the grippers 8 approach and pass over one of two end rollers 19, 20. The feeding rollers 4, 5 and the collating belt 9 may initially be driven at speeds such that the transport speed of the grippers 8 is similar or equal to the transport speed of postal items 2 in the feeding path 3. Prior to gripping of a postal item 2 by a gripper 8, the speed of the belt 9 may be reduced, to increase the transport speed of the postal item 2 relative to the grippers 8, thus driving a leading edge 7 of the postal item 2 between jaws of one of the grippers 8, and allowing the leading edge 7 of the postal item 2 to be gripped by the gripper 8. As the gripper 8 moves away from the end rollers 20 and passes into a straight section of the circulation path 10, the jaws move together and thereby grip any postal item 2 that has been brought between the jaws. In order to achieve that a postal item 2 enters a gripper 8 fast enough and far enough to reach a desired position in the gripper 8, it is noted that it is beneficial to generate a substantial difference between the circulation speed of the string of grippers 8 and the transport speed of the rollers 4, 5, such as at least a factor 2 or 3.

Figure 2:
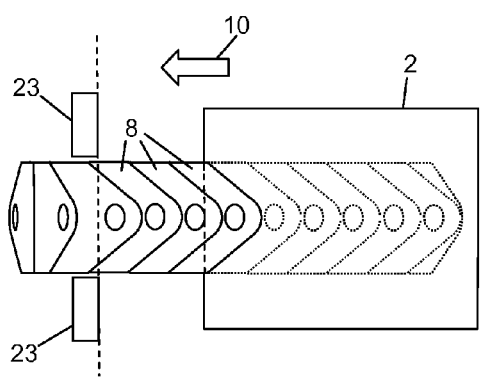
FIG. 2 depicts a cross-section drawing of the apparatus of FIG. 1 in accordance with an embodiment of the disclosure.

FIG. 2 depicts a cross-section bottom view detail of the apparatus 1 of FIG. 1. With reference to FIG. 1 and FIG. 2, grippers 8 transport a paper item 2 in the circulation path 10 toward the collector 12 and stopper 23, which are stationary relative to the grippers 8, at least during the collection of an item. The position of the collector 12 and the stopper 23 may however be modified between two collections, for example to adjust for different item lengths and/or to adapt to desired fold settings during further processing of the collated items (not shown in the figures). In operation, as the grippers 8 carrying postal items 2 proceed past the collector 12, the postal items 2 are removed from the grippers 8 and collected and collated from the grippers 8 by the stopper 23 to form a stack 13 (only the position of the stack is indicated in FIG. 1; for the sake of clarity of the drawing no physical items of the stack are drawn). In one embodiment, a stack holder 14 holding the stack 13 is supported by a spring 15 (shown schematically) which allows the stack holder 14 to descend as a height of the stack 13 increases with the number of collated postal items 2.

In the present embodiment, the stopper 23 is designed to interfere with the postal items 2 carried by the gripper 8 by stopping the postal item and causing it to slip out of the respective gripper 8. Removal of a postal item 2 from a gripper 8 is therefore the result of contact between the stationary stopper 23 and the moving postal item 2. This way, the collating system can be kept relatively simple and low cost, since it avoids for example the need to steer a gripper 8 so that it releases a postal item 2 before the postal item 2 reaches a precise desired position, such as due to contact with a member such as stopper 23.

While throughput of the apparatus 1 is directly related to a speed of the belt 9, the condition of the postal item 2 after removal from the gripper 8 is affected by both properties of the postal item 2, such as material properties or dimensions, and a velocity of collision between the postal item 2 and the stopper 23 of the collector 12 or, the speed of the postal item 2 relative to the stopper 23 at the time of contact with the stopper 23. It is desired that each postal item 2 is removed from gripper 8 and deposited on the stack 13 aligned with other postal items 2 therein without damage. The risk of damage to the postal item 2 and/or misalignment with other postal items 2 in the stack 13 is therefore a function of properties of the postal item 2 and gripper string speed. For example, as belt 9 speed and a stiffness (and/or strength) of the postal item 2 increase, an increased risk of misalignment of a stripped postal item 2 with other postal items 2 in the stack 13 may result, as both factors increase the tendency of the postal item 2 to rebound after a collision with the stopper 23. As another example, as a stiffness of the postal item 2 decreases the risk of damage at a given gripper string speed increases, as the postal item 2 tends to be deformed by contact with the stopper 23 more easily by buckling causing wrinkles in the postal item. As set forth above, stiffness is one example of a postal item 2 property that may influence a condition of the postal item 2 following removal from the gripper 8. Other exemplary properties that may influence the condition of the postal item 2 following removal from the gripper 8 include elasticity, thickness, density, total mass and size.

Figure 3:
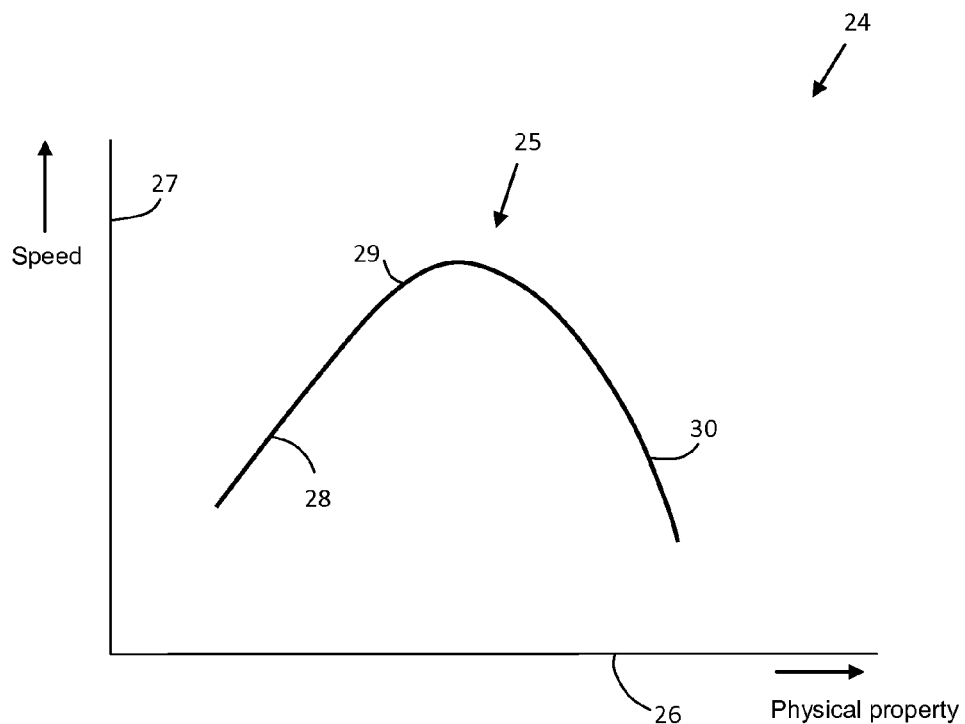
FIG. 3 depicts a graph of a characteristic curve in accordance with an embodiment of the disclosure.

FIG. 3 depicts a graph 24 of an example characteristic curve 25 that defines a range of operating conditions contemplated to enhance apparatus 1 throughput and condition of the postal item 2 following removal from the gripper 8. The characteristic curve 25 therefore defines a transfer speed, based upon and corresponding to the property of the postal item 2 that is contemplated to optimize throughput in terms of risk of damage and (unacceptable) misalignment. X axis 26 of the graph 24 represents an exemplary property of the postal item 2 and y axis 27 represents the speed of the postal item 2 at which the postal item 2 reaches the stopper 23, herein referred to as transfer speed. The example characteristic curve 25 depicts that at lower values of postal item 2 properties (such as thickness, for example), designated by a first zone (value range) 28, optimum throughput and postal item 2 condition may occur at lower postal item 2 transfer speeds, for instance to avoid damage to the postal item 2. Accordingly, as the value of the postal item 2 property (such as thickness, for example) increases, designated by a second zone 29 of the characteristic curve, optimum throughput and postal item 2 condition may occur at higher postal item 2 transfer speeds, for instance since a thicker postal item 2 tends to be less sensitive to damage than a thinner postal item 2. Finally, as the value of the postal item 2 property continues to increase, as designated by a third zone 30, optimum throughput and postal item 2 condition may require reduced postal item 2 transfer speeds, for instance because a thicker postal item 2 tends to be more likely to rebound, or "bounce", following contact with the stopper 23 and thereby become misaligned with other postal items 2 in the stack 13 and/or misaligned with respect to a desired alignment for further processing, such as folding or inserting into an envelope. In summary, characteristic curve 25 defines three zones contemplated to optimize throughput and condition of the item 2. The first zone includes relatively low values of both item property and transfer speed. The second zone includes increasing item property values and transfer speeds, greater than the first zone. The third zone includes increasing item property values, greater than the second zone, with decreasing transfer speeds, less than the second zone. While the graph 24 of FIG. 3 has been discussed including thickness as an exemplary postal item 2 property, it will be appreciated that the scope of the disclosure is not so limited, and that the characteristic curve 25 is contemplated to describe an optimized state of throughput and postal item 2 condition for other properties such as stiffness, elasticity, density, inertia, and size, for example.

Figure 4A:
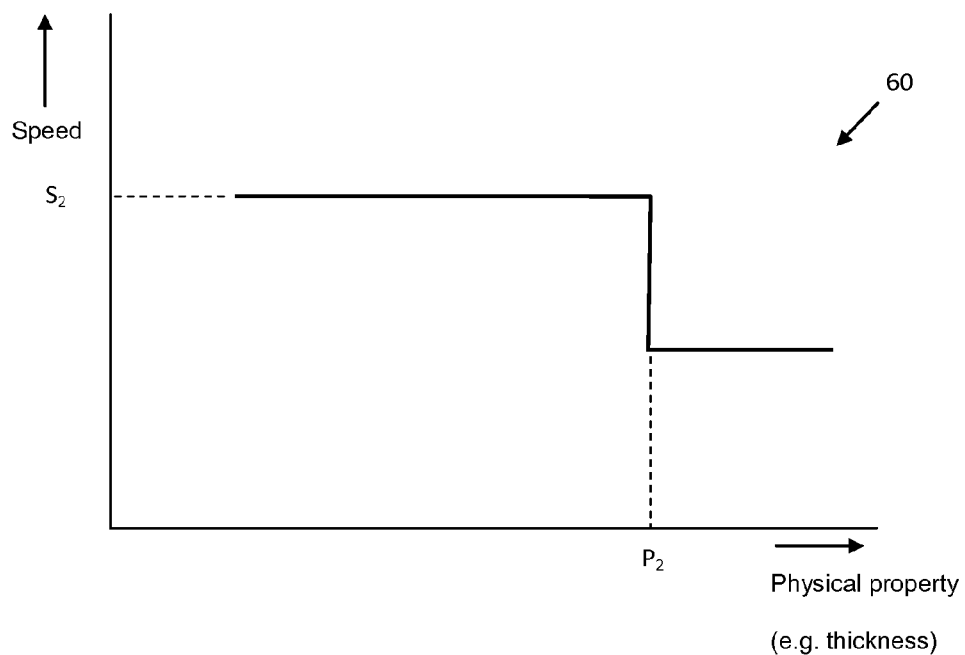
FIGS. 4A through 4C depict graphs of characteristic curves in accordance with an embodiment of the disclosure.

FIG. 4A depicts a graph of an example characteristic curve 60 including a change between two transfer speed values, such as from S2 to S1 at a material property threshold, as designated by P2. In response to determining that the postal item 2 property (such as thickness, for example) is greater than the value represented by P2, the speed of the postal item will be decreased from S2 to S1. In an embodiment, the processor 21 may determine the postal item 2 property and compare it to the threshold value P2. If the postal item 2 property is greater than the threshold value P2, the processor 21 is responsive to reduce the postal item transfer speed from S2 to S1. In an advantageous embodiment, this reduced speed S1 is similar to the reduced circulation speed of the string of grippers 8, required when an item 2 is entering a gripper 8 from the feeding path 3, so that an item 2 may enter a gripper 8 simultaneously with the collection of another item 2 at the collector 12. In such an embodiment, it may therefore be beneficial that the difference between the higher speed S2 and the lower speed is significant, such as at least a factor 2 or 3.

Figure 4B:
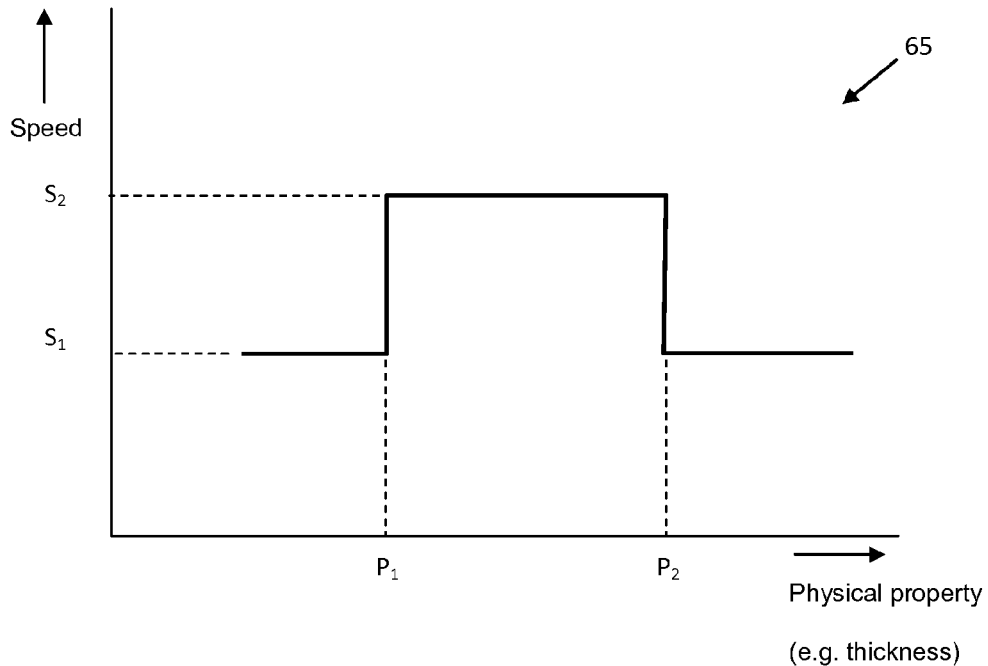

FIG. 4B depicts a graph of an example characteristic curve 65 including two transitions between two transfer speed values, such as from S1 to S2 at a first material property threshold, designated by P1, and from S2 to S1 at a second material property threshold, designated by P2. In response to determining that the postal item 2 property (such as thickness, for example) is less than the value represented by P1, the speed of the postal item will be set at S1. In response to determining that the postal item 2 property (such as thickness, for example) is greater than the value represented by P1 and less than the value represented by P2, the speed of the postal item will be set to S2. In an embodiment, the processor 21 may determine the postal item 2 property and compare it to the threshold values P1 and P2. If the postal item 2 property is less than the threshold value P1, the processor is responsive to set the postal item transfer speed at S1. If the postal item 2 property is greater than the threshold value P1 and less than the threshold value P2, the processor is responsive to set the postal item transfer speed at S2. Finally, if the postal item 2 property is greater than the threshold value P2, the processor is responsive to set the postal item transfer speed at S1.

Figure 4C:
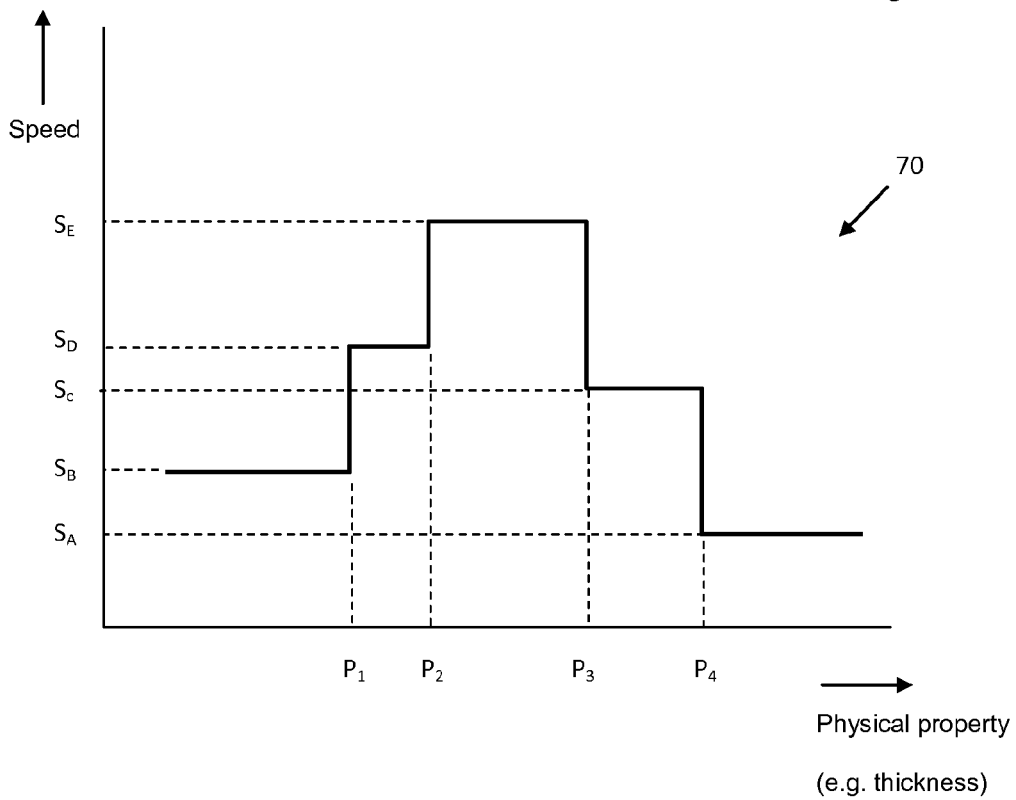

FIG. 4C depicts a generalized graph of an example characteristic curve 70 including four transitions between five transfer speed values, designated SA, SB, SC, SD, and SE based upon four material property thresholds, designated by P1 through P4. As described above, the transfer speed of the postal item will be set based upon determining the postal item 2 property (such as thickness, for example. For example, in response to determining that the postal item 2 property is greater than the value represented by P3 and less than the value represented by P4, the speed of the postal item will be set at SC. In an embodiment, the processor 21 may determine the postal item 2 property and compare it to the threshold values P1 through P4. Based upon the postal item 2 property relative to the threshold values, the processor 21 is responsive to set the postal item transfer speed at the corresponding speed level.

It is noted that FIGS. 4A, 4B and 4C could represent the curves of the transfer speeds at a range of values of a certain property, or a combination of properties, with respect to a certain value range of another property of the postal item 2. For instance, FIG. 4A could represent the thickness above which the transfer speed should be reduced for postal items of a certain length range, for instance shorter than 200 mm, while in another length range (for instance longer than 200 mm) the thickness threshold or speed could be different, according to a curve with different characteristic values. In this way a relation between several properties can be used by the processor 21 by means of for instance a plurality of look up tables.

With reference back to FIG. 1, the controller 21 has inputs connected to input lines 31, 34 for inputting postal item property signals from a user interface 35 and from a sensor 32 along the feed 3. Based upon the property signals received over the line 31 and/or the line 34, the controller 21 determines the values of the respective property of the postal item 2 and determines and controls the speed of the string of grippers 8 to optimize throughput, while avoiding stopping the postal items 2 from velocities that are unduly detrimental to collation alignment and/or postal item 2 condition. The property signal 31 may be provided by a property sensor 32 that is disposed proximate to the feeding path 3 so as to be able to sense the postal item property of interest, such a thickness, length and flexural stiffness. The property sensor 32 measures a property of the postal item 2 and generates the property signal 31 representative thereof. The sensor 32 is in signal communication with the controller 21 so that sensed postal item property signals can be directly inputted into the controller. Preferably, the controller 21 is arranged for determining and adjusting the velocity at which a postal item abuts against the stopper 23 individually for each postal item 2 in accordance with the sensed postal item property or properties. Thus, if postal items with different properties are loaded in the trays 36, postal items can be fed in any order from the trays 36, for instance in according with varying numbers of pages and inserts for successive mail pieces, and the order of feeding of postal items does not have to be communicated to the collator to allow for adjustment of the velocity up to the stopper 23 to the properties of the respective postal items 2. It may be understood that sensor 32 could be represented by one or more sensors being able to sense one or more properties of the postal items 2, and such sensors could be located along the feeding path 3 including the proximity of the trays 36, as is for example shown in FIG. 1 indicated by the sensors 56. These sensors 56 can also be in signal communication with controller 21 via signal 37. For instance, such sensors 56 could comprise thickness and length detection in the proximity of the feeder trays 36, as is often already the case in systems for handling postal items.

The property signals and also material property-gripper velocity functions may be inputted via the user interface 35, for instance by user entry upon a keypad or touch screen. Provision of the property signal 34 to the controller 21 via the user interface 35 is contemplated to include direct entry of any one or more of the postal item 2 properties (such as thickness, length, width, mass, density and elasticity, for example), and/or material property thresholds and transfer speed values. Provision of the property signal 34 and/or material property thresholds and transfer speed values via the user interface 35 may also include entry of a code associated with postal item 2 properties, such as a job number with which one or more of the postal item 2 properties may be associated and stored within a memory of the controller 21, such as via a look up table, for example. If a type of postal items is processed frequently, the maximum velocity of arrival at the stopper 23 at which damage and misalignment is avoided may also be determined by testing instead of being calculated using applicable values of the material properties and one or more material property—velocity functions. The determined velocity can then be stored as a setting for the particular type of postal item or as a setting of a job involving the processing of postal items of that particular type. Accordingly, determining the postal item 2 property or even the acceptable maximum velocity may include retrieving the property value or velocity from a memory, for instance the memory of the controller 21. Determining maximum velocity values for a particular type of postal item may be carried out adaptively, such as by entry of observed conditions of the postal item 2 following contact with the stopper 23 at various velocities.

The controller 21 is receptive of the property signal 31, 34 and adjusts a speed of the drive motor 11, and therefore postal item 2, at a time of contact or collision between the postal item 2 and stopper 23 to optimize both throughput and the condition of the postal item 2 following removal from the gripper 8.

In an exemplary embodiment, the property sensor 32 is a thickness sensor 31 that measures a thickness of the postal item 2 as it proceeds through the feed path 3. Thickness sensor 32 is productive of a thickness signal 31 representative of the thickness of the postal item 2. The controller 21 is receptive of the thickness signal 31 to adjust the velocity of the belt 9, and postal item 2 at a time of contact with stopper 23, via drive motor 11. Based upon the thickness of the postal item 2, the controller 21 determines the appropriate speed of the postal item 2 at the time of contact with the stopper 23 to optimize throughput and condition of the postal item 2 following removal from the gripper 8. For example, the relationship between thickness and speed represented by the characteristic curves 25, 60-70, may be available to the controller 21 in the form of a look-up table, and upon receiving the thickness signal 31, the controller 21 determines an appropriate speed of the postal item 2 corresponding to its thickness. The controller 21 is productive of a speed control signal 33 representative of the appropriate speed, and the drive motor 11 is responsive to the speed control signal 33 to operate at the appropriate speed. Therefore, prior to contact between the postal item 2 and stopper 23, the controller 21 adjusts the speed of the motor 11 (and thus, postal item 2) to the appropriate speed represented by the characteristic curve 25, 60-70 to optimize throughput and condition of the postal item 2.

In another embodiment, the property sensor 32 may include more than one sensor, in order to obtain more than one property associated with the postal item 2. For example, the property sensor 32 may include the thickness sensor 32 as well as a width sensor 32 productive of a width signal representative of the width of the postal item 2. In an embodiment, the width sensor 32 may be coupled to side guides (not shown) that are included within a feeding tray in front of the feeding path 3. The width signal is based upon a position of the side guides, which are generally disposed in close proximity to the postal item 2 to provide and maintain feeding alignment thereof. In a further embodiment, the property sensor 32 may also include a length sensor 32 productive of a length signal that is representative of the length of the postal item 2. The length sensor 32 may be combined with other property sensors 32, such as the thickness sensor or the width sensor 32, for example. Examples of length sensors 32 include imaging devices, such as a scanner, or a charge-coupled device (CCD), for example and use imaging techniques to determine a length of the postal item 2. Such imaging techniques can provide the length signal while the postal item 2 is positioned in the feed path 3. An alternate length sensor 32 arrangement includes an encoder wheel that generates pulses in response to a rotation of any axis in the transport path (such as a feed and/or gripper) related to the transportation of the postal item 2, or any axis connected to rollers that are rotated in response to transportation of the postal item 2. Such arrangement may also include a detector capable of detecting the presence of the postal item while it is transported along the transport path from the feed to the collector, such as an optical sensor, a touch switch, or a thickness detector, so that the moment the leading edge and the trailing edge of the postal item passes by the detector can be determined. Use of such combinations of presence detectors and postal item displacement encoders to determine a length of an item will be appreciated by one of skill in the art. The controller 21 can use the property signals 31 provided by these property sensors 32 as inputs to determine and derive properties associated with the postal item, such as volume, for example. Further exemplary property sensors 32 include, without limitation, scanners to read barcodes that may be imprinted upon the postal item (such as a barcode that fluoresces in response to ultraviolet light), barcodes upon postal item 2 packaging material, watermarks upon the postal item 2, or RFID tags that may be incorporated within the postal item 2 or postal item 2 packaging material. One or more values representing properties of items may be provided to the controller 21 by measurement prior to processing a batch of postal items 2.

In an embodiment, material properties may be stored in a library, and the user selects the material, or the material is recognized by the system via a code provided on the item, or by recognizing a combination of physical properties, and/or by recognizing visual aspects by scanning, for example. In such a material library/look up table, a maximum collating speed may also be stored, such as may be based on empirical experience for a particular postal item 2. Such a maximum speed indication may be determined in a quantification such as millimeters per second (mm/s), or may be qualitative, via categories such as 'high', 'normal', 'reduced' and 'slow', or expressed in a speed percentage of the nominal speed, such as 100%, 75% and 50%, for example.

A combination of properties can be used. For example, a property signal 34 provided via the user interface 35 may be combined with a property signal 31 provided via one or more property sensors 32 in order to derive a related material property. As a non-limiting example, density may be input via the user interface 35 and combined with thickness, length, and width to determine a mass or inertia of the postal item 2. Additionally, properties measured during operation via property sensors 32 may be combined with previously stored properties. Property values may also be selected from previously stored values by recognition, such as scanning the item and comparing at least a part of the scanned image with previously stored images.

Throughput of the apparatus 1 may be further enhanced by increasing the drive 11 speed above the appropriate speed represented by characteristic curves 25, 60-75 at times other than when a postal item 2 is about to contact the stopper 23. In one embodiment, a default operating or transport speed of the belt 9, at times other than when a postal item 2 is about to contact the stopper 23, may be greater than the appropriate speed represented by characteristic curves 25, 60-70. A presence sensor 36 may be disposed upstream of the stopper 23 in signal communication with the controller 11. The presence sensor 36 determines a presence of the postal item 2 about to contact the stopper 23. In response to such determination, the presence sensor 36 is productive of a presence signal 37 and provides the presence signal 37 to the controller 21. The controller 21 is responsive to the presence signal 37, indicative of the impending contact of the postal item 2 with the stopper 23, to reduce the transport speed of the belt 9 from the default speed to the appropriate speed represented by characteristic curves 25, 60-70. In one embodiment, the appropriate speed represented by characteristic curves 25, 60-70 are maintained for a duration that is based upon the distance from the presence sensor 36 to the stopper 23 and an appropriate time to decelerate, after which the controller 21 adjusts the belt 9 speed back to the default transport speed until presence of another, successive postal item 2 is detected by the presence sensor 36.

Figure 5:
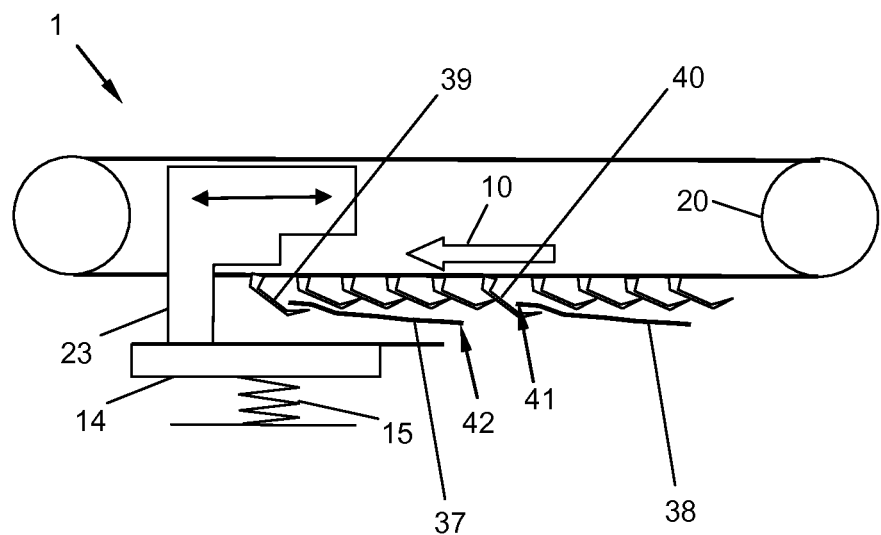
FIG. 5 depicts a schematic drawing of the apparatus of FIG. 1 in accordance with an embodiment of the disclosure.

Throughput may also be enhanced via transport speed adjustment based upon spacing between postal items 2. FIG. 5 depicts an embodiment of the apparatus 1 having postal items 37, 38, arranged in a sequential manner with postal item 38 disposed upstream relative to postal item 37, and carried by grippers 39, 40, respectively. The sequential arrangement includes disposition of the postal items 37, 38 such that a leading edge 41 of the upstream postal item 38 is disposed upstream of a trailing edge 42 of the adjacent upstream postal item 37. In an exemplary embodiment employing sequential arrangement of postal items 37, 38, the controller 21 increases the speed of the drive motor 11 following removal of the downstream postal item 37 from gripper 39. Prior to contact of the upstream postal item 38 with the stopper 23, the controller 21 reduces the motor 11 speed to the appropriate speed represented by characteristic curves 25, 60-70 (FIGS. 3 and 4A-4C). Such cycles of speed adjustment are contemplated to increase apparatus 1 throughput while maintaining a desired condition of the postal item 2 following removal from the gripper 8, as described herein.

Figure 6:
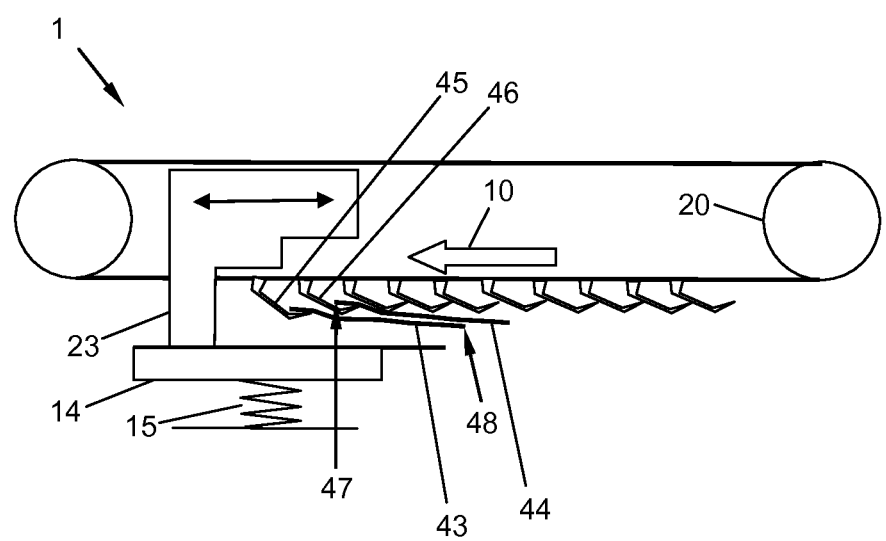
FIG. 6 depicts a schematic drawing of the apparatus of FIG. 1 in accordance with an embodiment of the disclosure.

FIG. 6 depicts an embodiment of the apparatus 1 having postal items 43, 44, arranged in an overlapped manner, with postal item 44 disposed upstream relative to postal item 43, and carried by grippers 45, 46 respectively. The overlapped arrangement includes disposition of a postal item, such as postal item 44 for example, such that a leading edge 47 of the upstream postal item 44 is disposed downstream of a trailing edge 48 of the adjacent downstream postal item 43. In some instances, the overlapped arrangement may provide a spacing between postal items 43, 44 such that it may not be feasible or desirable to accelerate above and decelerate to the appropriate speed within the time corresponding to the spacing between the overlapped postal items 43, 44. In such instances of overlapped postal items 43, 44, the controller 21 may maintain the appropriate speed represented by characteristic curves 25, 60-70 (FIGS. 3 and 4A-4C) to optimize throughput and avoid any collision of the postal items 2 with the stopper 23 at a speed higher than the appropriate speed represented by the characteristic curve 25.

In another embodiment, property sensor 32 may function to provide to the controller 21 an indication of the presence and insertion of the postal item 2 into the gripper 8. The controller 21 may be receptive of a motor rotation speed signal produced by the drive motor 11 that is representative of the motor 11 speed. Therefore, controller 21 may determine a location of any specific postal item 2, as well as spacing between successive postal items 2, along the circulation path 10.

Figure 7:
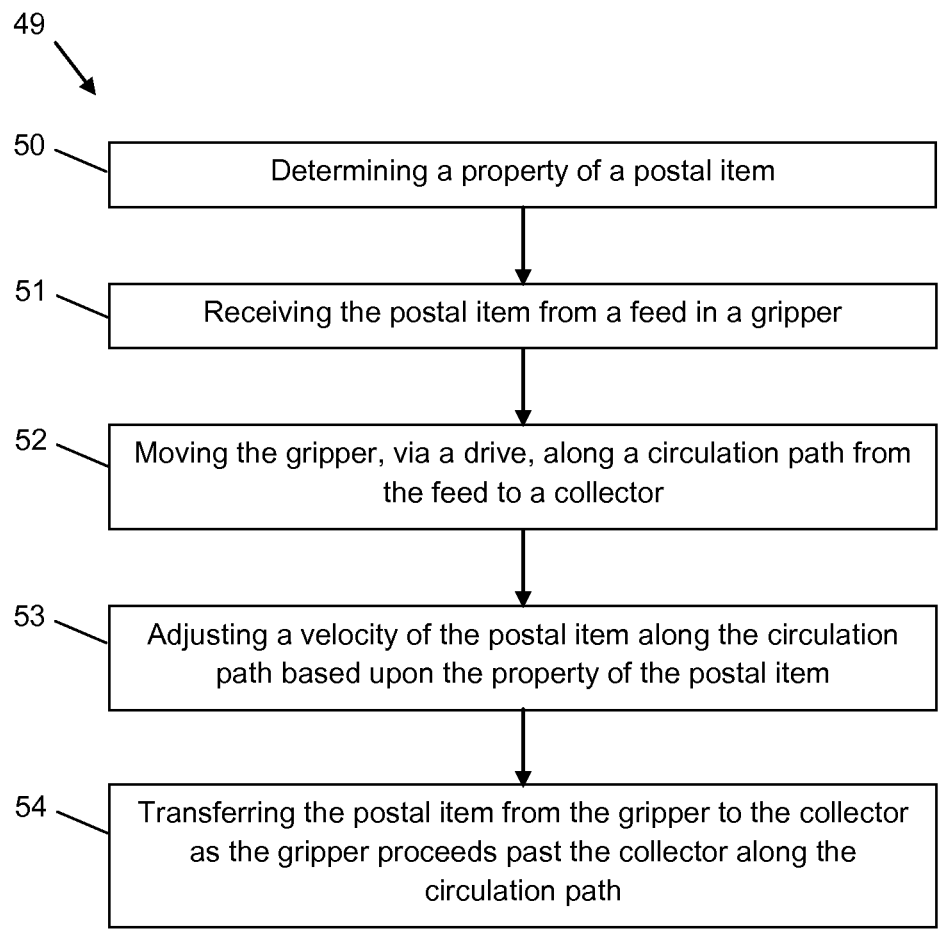
FIG. 7 depicts a flowchart of process steps for collating paper items in accordance with an embodiment of the disclosure.

In view of the foregoing, the apparatus 1 facilitates a method of collating postal items. FIG. 7 depicts a flowchart 49 of example process steps of a method for collating postal items. The process begins at step 50 by determining a property of the postal item 2. At step 51, the process continues with the gripper 8 receiving the postal item 2 from the feed 3. The process continues, at step 52, by moving the gripper 8, along the circulation path 10 from the feed 3 to the collector 12. Based upon the property of the postal item 2 determined in step 50, process step 53 includes adjusting a velocity of the postal item 2, via the belt 9, such as to the appropriate speed represented by characteristic curve 25, for example. The example process concludes with step 54 by transferring the postal item 2 to the collector 12, in a desired condition with reduced damage and misalignment.

While the disclosure has been illustrated and described in detail in the drawing and foregoing description, such illustration and description are to be considered illustrative or exemplary and not restrictive; the scope of disclosure is not limited to the disclosed embodiments. For instance, in the present example, the grippers include a pair of fingers between which the postal items are gripped. However, the postal items may also be transported in another manner, for instance by suction in, for instance, a suction cup that pulls the postal item against the gripper, a conveying belt, or a suction belt, for example. It can also be advantageous to provide that the grippers grip postal items while passing through a straight section of the circulation path. To this end, for example, guide rails may be arranged along the circulation path, which guide rails engage operating arms coupled to one or more of the jaws of the grippers as the grippers pass the guide rail.

Furthermore, the collector 12 and the stopper 23 of the shown embodiment are arranged in positions that are stationary along the circulation path 10. To allow for higher velocities of transport of postal items 2 arriving at the stopper, the collector and/or the stopper may also be displaceable back and forth in and against the direction of movement of the grippers. The collector and/or the stopper may for instance be passively displaceable to resiliently move in transport direction when hit by an arriving postal item and then be arranged to automatically move back, for instance under influence of gravity, an elastic biasing member or a drive motor. Such a feature is particularly advantageous to counteract bouncing back of heavier and stiff postal items. The collector and/or the stopper may also be actively displaceable so as to reduce the speed of a postal item relative to the collector or stopper when arriving at the collector or stopper at a given speed of transport and to reduce the speed of the collector or stopper once it has engaged the postal item. This allows selecting velocities of transport of the grippers for a given type of postal items that exceed the maximum velocities applicable for that type of postal item at which damage to the postal items or collation misalignment stays within acceptable limits.

Furthermore, in the present example, the postal items each include a single item. However, one or more of the postal items may include a plurality of elements, for instance two or more sheets that may be affixed to each other and/or folded. As disclosed, some embodiments of the apparatus 1 may include some of the following advantages: enhanced throughput, allowing more postal items 2 to be collected in a given period of time; enhanced quality, with reduced damage to each postal item 2 resulting from removal of the postal item 2 from the gripper, and increased alignment between successive postal items collected together in the stack 13; enhanced operational efficiency, as throughput may be optimized based on a specific property for each postal item from a plurality of postal items having varying properties; and increased quality and reliability of subsequent operations such as folding and insertion into an envelope because resulting from enhanced alignment of a plurality of postal items of varying sizes and shapes.

An embodiment of the invention may be embodied in the form of computer-implemented processes and apparatuses for practicing those processes. Embodiments of the present invention may also be embodied in the form of a computer program product having computer program code containing instructions embodied in tangible media, such as floppy diskettes, CD-ROMs, hard drives, USB (universal serial bus) drives, or any other computer readable storage medium, wherein, when the computer program code is loaded into and executed by a computer, the computer becomes an apparatus for practicing the invention. Embodiments of the invention also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to adjust a transport speed of a postal item within a collating apparatus based upon a property of the postal item in order to increase apparatus throughput and reduce postal item damage.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A postal item collating system comprising:
   a feeding path for feeding postal items to be collated;
   at least one gripper;
   a drive in operative communication with said at least one gripper for driving said at least one gripper along a circulation path, wherein said at least one gripper is arranged for receiving a postal item from the feeding path when in a section of the circulation path downstream of the feeding path;
   a collector disposed along the circulation path downstream of the feeding path removing a postal item from said at least one gripper as the at least one gripper proceeds past the collector; and
   a controller having an input for inputting a signal representing a property of the received postal item and an output in signal communication with the drive for controlling the velocity of said at least one gripper along the circulation path, the controller being responsive to the inputted property signal for controlling the velocity of said at least one gripper along the circulation path in accordance with the inputted property signal,
   wherein the controller is responsive to the property signal to control a velocity of collision of the received postal item against the collector, said postal item collating system further comprising a sensor disposed proximate the feeding path and in signal communication with the controller, the sensor being productive of the property signal.

2. The postal item collating system of claim 1, wherein the sensor is arranged for generating the property signal in accordance with a sensed property of the postal item, wherein the property sensed is a property selected from the group consisting of thickness, length, density, total mass, size, elasticity and stiffness.

3. The postal item collating system of claim 2, wherein the sensor is a thickness sensor and arranged for generating the property signal in accordance with a sensed thickness of the received postal item.

4. The postal item collating system according to claim 1, wherein the controller is responsive to the property signal to reduce the velocity of said at least one gripper, prior to contact between a leading edge of the received postal item and the collector and to increase the velocity of said at least one gripper, after said contact between a leading edge of the received postal item and the collector.

5. The postal item collating system of claim 4, wherein said at least one gripper for receiving the postal item is part of a string of grippers and wherein the controller is arranged for controlling the velocity of the carrier in accordance with a spacing between leading edges of successive received postal items engaged by the string of grippers.

6. The postal item collating system according to claim 1, wherein:
   the controller is responsive to the property signal to determine the property of the received postal item and to control the velocity of said at least one gripper in accordance with a defined characteristic curve, said curve comprising:
   a first zone defining a first range of values of the property and a corresponding first range of velocities of said at least one gripper; and
   a second zone defining a second range of values of the property and a corresponding second range of velocities of said at least one gripper;
   the second range of values of the property and corresponding velocities of said at least one gripper being different from the first range of values of the property and corresponding velocities of said at least one gripper.

7. The postal item collating system according to claim 1, wherein:
   the controller is responsive to the property signal to determine the property of the received postal item and control the velocity of said at least one gripper in accordance with a defined characteristic curve, said curve comprising:
   a first zone defining a first range of values of the property and a corresponding first range of velocities of said at least one gripper;
   a second zone defining a second range of values of the property and a corresponding second range of velocities of said at least one gripper; and a third zone defining a third range of values of the property and corresponding third range of velocities of said at least one gripper;

the second range of values of the property and corresponding velocities of said at least one gripper are greater than the first range of values of the property and corresponding velocities of said at least one gripper;

the third range of values of the property are greater than the second range of values of the property; and the corresponding third range of values of velocities of said at least one gripper are less than the corresponding second range of values of velocities of said gripper.

8. The postal item collating system according to claim 1, wherein said at least one gripper for receiving the postal item is part of a string of grippers.

9. A method of collating postal items comprising:
feeding a postal item to be collated along a feeding path;
receiving, within at least one gripper, the postal item from the feeding path;
driving with a drive said at least one gripper along a circulation path from downstream of the paper feeding path to a collector;
controlling with a controller a velocity of said at least one gripper; and
removing the postal item received by said at least one gripper with the collector as said at least one gripper proceeds along the circulation path past the collector, wherein said method of collating postal items further comprises
determining a property of a postal item to be received by said at least one gripper with a sensor disposed along the feeding path; and
generating a property signal in accordance with a sensed property of the postal item, wherein said controlling the velocity comprises controlling a velocity of collision of the received postal item against the collector.

10. The method of claim 9, wherein the determining of a property comprises retrieving a property value stored in memory.

11. The method of claim 9, further comprising:
comparing the determined property with a threshold property value.

12. The method according to claim 9, wherein:
said determining of a property of a postal item with the sensor comprises sensing at least one of a thickness, a length, a density, a total mass, a size, an elasticity, a stiffness of the postal item.

13. The method according to claim 12, wherein said determining of a property of a postal item using the sensor comprises sensing a thickness of the postal item.

14. The method according to claim 9, wherein controlling the velocity of collision comprises:

reducing the velocity of said at least one gripper prior to contact between a leading edge of the received postal item and the collector and increasing the velocity of said at least one gripper after said contact between a leading edge of the received postal item and the stationary collector.

15. The method of claim 14, further comprising:
adjusting the velocity of said at least one gripper in accordance with a spacing between leading edges of the successive received postal items within the circulation path.

16. The method according to claim 9, wherein controlling the velocity of said at least one gripper based on the determined property of the received postal item is executed in accordance with a defined characteristic curve, said curve comprising:
a first zone defining a first range of values of the property and a corresponding first range of velocities of said at least one gripper; and
a second zone defining a second range of values of the property and a corresponding second range of velocities of said at least one gripper;
the second range of values of the property and corresponding velocities of said at least one gripper being different from the first range of values of the property and corresponding velocities of said at least one gripper.

17. The method according to claim 9, wherein controlling the velocity of said at least one gripper based on the determined property of the received postal item is executed in accordance with a defined characteristic curve, said curve comprising:
a first zone defining a first range of values of the property and a corresponding first range of velocities of said at least one gripper;
a second zone defining a second range of values of the property and a corresponding second range of velocities of said at least one gripper; and
a third zone defining a third range of values of the property and corresponding third range of velocities of said at least one gripper;
the second range of values of the property and corresponding velocities of said at least one gripper being greater than the first range of values of the property and corresponding velocities of said at least one gripper;
the third range of values of the property being greater than the second range of values of the property; and
the corresponding third range of values of velocities of said at least one gripper being less than the corresponding second range of values of velocities of said at least one gripper.

18. The method according to claim 9, wherein said at least one gripper for receiving the postal item is part of a string of grippers.

* * * * *